(12) United States Patent
Manabat

(10) Patent No.: US 6,805,246 B1
(45) Date of Patent: Oct. 19, 2004

(54) KITCHEN-COOKING CADDY

(76) Inventor: Gregorio S. Manabat, 7262 Melrose St., #313, Buena Park, CA (US) 90621

( * ) Notice: Subject to any disclaimer, the term of this patent is extended or adjusted under 35 U.S.C. 154(b) by 48 days.

(21) Appl. No.: 10/383,808

(22) Filed: Mar. 7, 2003

(51) Int. Cl.$^7$ ................................................. A47F 5/00
(52) U.S. Cl. ................... 211/13.1; 211/41.11; 211/70.7; 108/25; 248/37.3; 294/161
(58) Field of Search ............................ 211/41.11, 70.7, 211/13.1, 195, 149; 108/108, 25; 248/37.3, 37.6; 294/161

(56) References Cited

U.S. PATENT DOCUMENTS

| | | | | |
|---|---|---|---|---|
| 1,273,397 A | * | 7/1918 | Neill | 108/110 |
| D135,982 S | * | 7/1943 | Morris | D6/469 |
| 2,525,405 A | * | 10/1950 | Feiertag | 209/612 |
| D169,433 S | * | 4/1953 | Goldman | D7/641 |
| 2,845,323 A | * | 7/1958 | Seibert, Jr. | 312/244 |
| 2,894,639 A | * | 7/1959 | Caporicci | 108/59 |
| 4,377,384 A | * | 3/1983 | Williams | 434/209 |
| 5,396,993 A | * | 3/1995 | Spitler | 211/41.2 |
| 5,713,552 A | * | 2/1998 | Diamant | 248/460 |
| 5,979,673 A | * | 11/1999 | Dooley | 211/41.11 |
| 6,012,593 A | * | 1/2000 | Knittel et al. | 211/41.11 |
| 6,505,746 B1 | * | 1/2003 | Johnson | 211/70.7 |

* cited by examiner

*Primary Examiner*—Robert W. Gibson, Jr.
(74) *Attorney, Agent, or Firm*—James G O'Neill; Klein, O'Neill & Singh, LLP

(57) ABSTRACT

A portable caddy for use in and around a stove in a kitchen or other cooking area includes a number of features to aid cooks in preparing meals while maintaining the space being used in a clean and neat condition. The caddy includes a support base with an adjustable platform for a pan, pot or lid, as well as adjustable or removable shelves for convenience and accessibility while cooking. In the open and locked position, the adjustable platform allows the entire caddy to be rotated. A number of areas are provided for holding condiments and a retractable cutting board is held in the base. Extendable elements may be secured in a top portion of the caddy, for holding further utensils.

20 Claims, 5 Drawing Sheets

KITCHEN-COOKING CADDY

BACKGROUND OF THE INVENTION

1. Field of the Invention

This invention relates generally to portable cooking accessories, and more particularly to a caddy for temporarily holding condiments, cooking and kitchen implements, and pots, pans and/or lids in a convenient and sanitary manner.

2. Description of the Prior Art

As is well known, during the heating and/or preparation of food, the food preparer or cook uses a variety of pots and pans, as well as condiments and implements, such as herbs, juices, spices, forks, scissors, spoons, ladles, or the like. During cooking and/or food preparation at a stove or the like, the cook is always setting aside condiments and implements, cleaning up and searching for misplaced items. Additionally, pots and pans must sometimes be moved, as for example when serving. Also, when adding ingredients or condiments to a pot or pan, removable lids must be set aside, for example on available counter space, tables, or the like. Many difficulties and problems arise during cooking and food preparation due to the lack of space, leaking and spilling of ingredients, the high temperature of pots, pans, implements and/or lids when taken off a stove and the misplacement of implements and/or ingredients, etc.

Some prior art devices, such as spoon rests and combined spoon rests and hd holders have been devised in an attempt to overcome some of the known difficulties and problems. These known devices work well to a limited degree, but are typically very specialized and not usable for all items or implements, or in all situations.

One such prior art device is disclosed in U.S. Pat. No. 5,396,993, issued Mar. 14, 1995 to Spitler. The Spitler device is a holder or stand having a base with a central depression and a notched rail to hold a spoon, a pair of raised receptacles to hold other implements and an upright adjustable post supporting a yoke to hold a pot or pan lid. However, the device of Spitler does not include means to hold condiments or a pot or pan, is not capable of being rotated or moved to orientate items, without being lifted, and lacks other features and the versatility to be useful to all cooks and in substantially all cooking situations.

Therefore, there exists a need in the art for a caddy that is portable for use in and around a kitchen or other cooking area, and which includes a number of features lacking in known devices, to aid cooks in preparing meals while maintaining the space being used in a clean and orderly condition. The kitchen-cooking caddy of the present invention includes a support base with an adjustable platform for supporting one or more pans, pots or lids, as well as adjustable or removable shelves for providing convenient accessibility of spoons or the like while cooking or preparing foods. The present invention may also include a number of areas for condiments, as well as a conveniently placed retractable cutting board. Extendable elements may also be held in a top portion of the caddy, for supporting recipes, further utensils, or the like.

SUMMARY OF THE INVENTION

Accordingly, it is a general object of the present invention to provide an improved caddy for holding kitchen implements or utensils. It is a particular object of the present invention to provide an improved kitchen-cooking caddy that is both versatile and strong. It is a further particular object of the present invention to provide an improved kitchen-cooking caddy having a large number of features to aid a cook in preparing and cooking meals in a sanitary and facile manner. It is yet another particular object of the present invention to provide an improved kitchen-cooking caddy having movable portions that are held in a base to allow the caddy to be more easily properly orientated, as well as easily transportable. And, it is still a further particular object of the present invention to provide an improved kitchen-cooking caddy having a number of movable portions to allow the caddy to support a variety of items in convenient, adjustable locations for ready accessibility of the items, such as pots, pans, implements and condiments, as needed.

In accordance with one aspect of the present invention, there is provided an improved kitchen-cooking caddy having a base supporting a wall portion. The wall portion has two sides, one of which includes a plurality of shelves for supporting various condiments, implements or utensils. Another of the sides includes a movable board or platform attached thereto. Angled implement holding portions are disposed between the sides. These angled implement holding portions may also be used to support a lid from a pot or pan. The movable board or platform is lockable in a raised or a lowered position and also includes means to rotate the entire caddy and other means to extend the platform.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
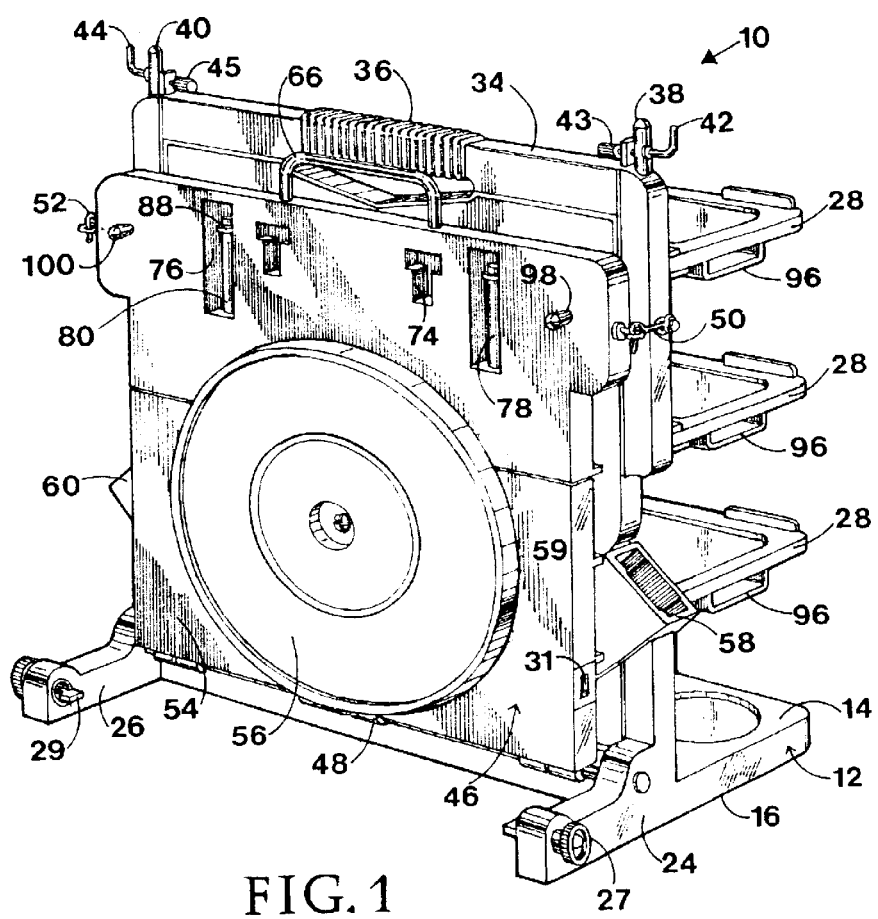
FIG. 1 is a perspective view of a kitchen-cooking caddy of the present invention looking toward a first side having a movable platform thereon secured in a raised or upper position for ease in storage or transport.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved caddy 10 for use on or around a stove in a kitchen, or in other cooking areas.

Referring now to the drawings, there shown is a preferred embodiment of the caddy 10 for use in and around a stove and/or other cooking areas, such as outdoor barbeque areas, or the like. The caddy 10 is generally formed with a base 12, which is shown as being rectangular, but which may have any desired shape. The base 12 has a top 14 and a bottom 16. The top 14 may be flat, or include other means attached thereto, or formed therein, such as one or more shallow depressions or recesses 18 for holding condiment carrying containers 20, such as cups or jars (see FIGS. 2 and 5). A wall 22 is secured to the base 12 along an edge, preferably perpendicular thereto, and at least one and preferably two legs 24, 26 extend from the same edge to provide further support for the caddy 10. Each of the legs 24, 26 has a locking element or means 27, 29 held therein, as explained more fully below.

A first side 25 of the wall 22, referred to as the first side for convenience only, has a board, platform or support 46 held thereto, as by means of a hinge 48. The board, platform or support 46 is held in the up or closed position shown in FIG. 1 by holding elements 50, 52, such as clips, hooks or other locking means. The board, platform or support 46 is movable to a lowered position as shown in FIGS. 2–5 and includes a first or bottom surface 54 having a means 56 for rotating the entire caddy secured thereto. The means for rotating may take any form in which a lower portion rests on a flat surface 55 (see FIG. 5) and the lower portion is rotatably captured, journaled or otherwise connected to an upper portion secured to the bottom surface 54 to allow the entire caddy to be rotated. For example, the means for rotating 56 may be a "Lazy Susan" type device, having a raceway with a plurality of ball bearings secured or journaled therein. The means for rotating 56 will only be operative when the board, platform or support 46 is secured in the lowered position, as best shown in FIG. 5, by means of the locking elements 27, 29. The locking elements 27, 29 include outer ends that are insertable into and held in apertures or openings 31, 33 formed in side edges of the platform 46 (see FIG. 4).

A top 34 of the wall 22 may include a carrying handle 36 for transporting the caddy. Additionally, extensible holding rods 38, 40 may be adjustably secured in the top 34, for example at opposed ends thereof. The holding rods 38, 40 may have any desired cross-section, such as rectangular or round, and have hooks 42, 44 formed or secured at outer ends to carry or support beaters, recipes, spoons or other implements or utensils. The rods 38, 40 are held in place by locking means 43, 45, which locking means are loosened and the rods extended (see FIGS. 2 and 3), where they also may be secured in place by the locking means.

The other or second side 23 of the wall 22 includes a plurality of shelves 28. The shelves 28 may have any desired shape or structure and preferably include guards or raised portions to prevent utensils such as spatulas or spoons from falling off the surfaces. Two sides of the shelves 28 may be depressed in an angled shape to collect the debris coming from the utensils. The shelves may be permanently secured to the side 23, but are preferably removably mounted in spaced holding areas or portions 30, formed on or securely held on the first side 23. The shelves 28 may also include one or more supporting braces or brackets 32 to enable the shelves to carry heavy loads.

The wall 22 also includes one or more upwardly angled holders 58, 60 on opposed side edges. These upwardly angled holders 58, 60 preferably have pockets or openings formed therein and are secured in or made a part of the wall 22. The upwardly angled holders 58, 60 are used to carry or hold knives, scissors, or the like in the pockets or openings, so that the knives, etc. may be easily inserted into, or removed from the angled holders, when needed. These upwardly angled holders 58, 60 are formed at any desired or selected angle so as to be effectively used to hold implements and to support a pot or pan lid or top, in a substantially vertical position, between angled side edges 59, 61 (see FIG. 2), when the board 46 is in the lowered position.

The caddy 10 may be made from any desired material or materials, such as a molded plastic, one or more woods, easily formed metals, or the like.

Figure 2:
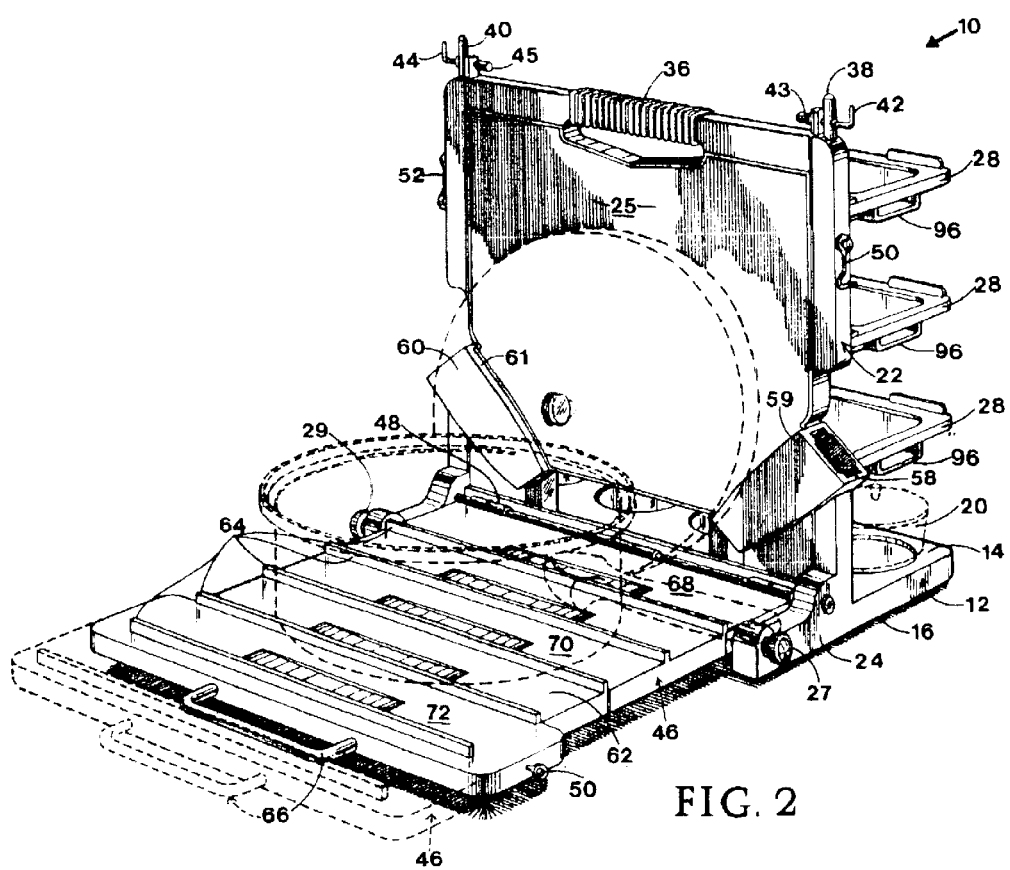
FIG. 2 is a further perspective view of the kitchen-cooking caddy of the present invention, with the movable platform secured in a lowered or working position.
Figure 4:
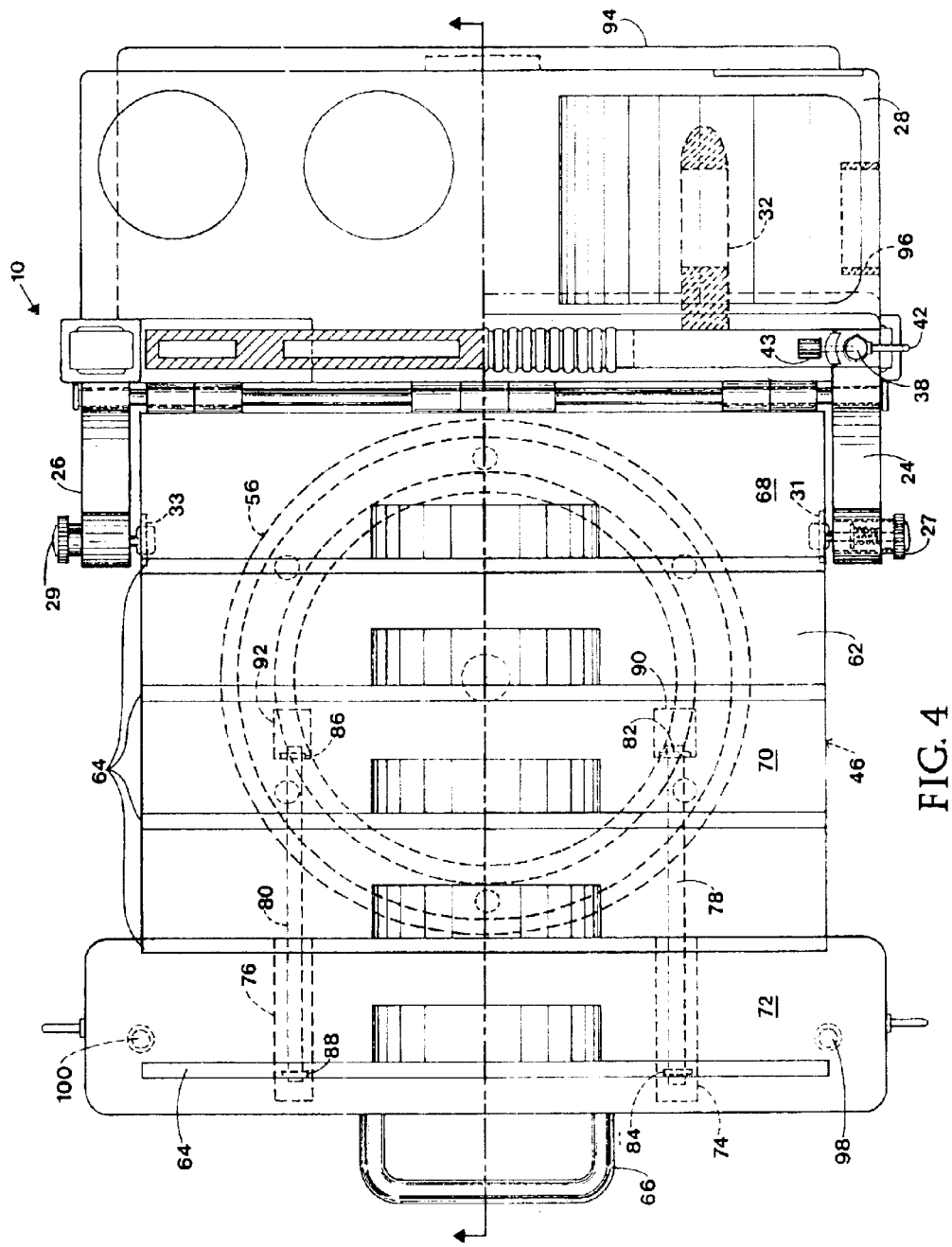
FIG. 4 is a top plan view, with a portion removed, of FIG. 2.
Figure 5:
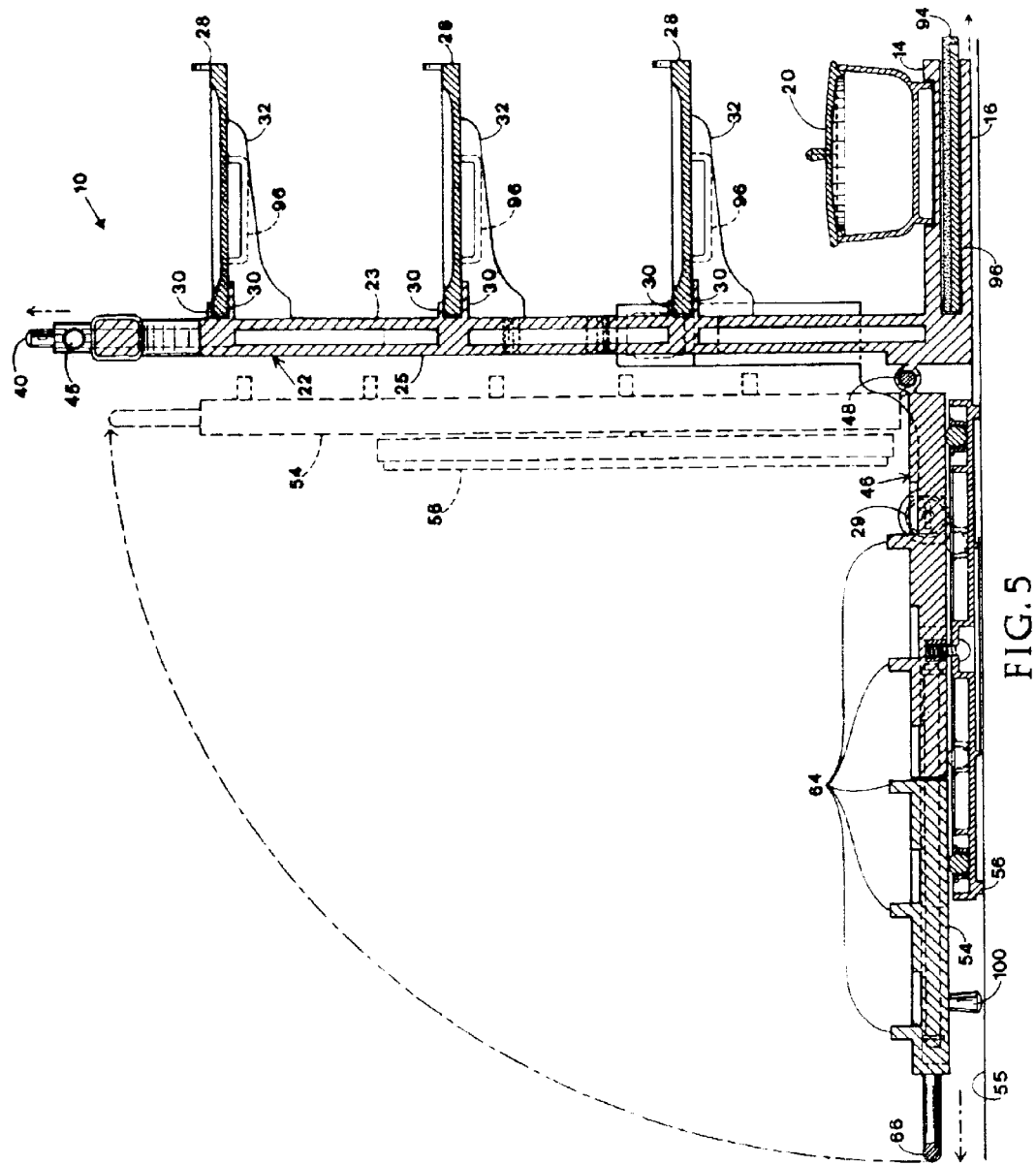
FIG. 5 is a cross-sectional view of FIG. 2.

As best shown in FIGS. 2 and 4, the board, platform or support 46 includes an upper or second surface 62 having a plurality of ridges or spaces formed therein by means of perpendicular spacers or spines 64 held therein. The spacers or spines 64 are preferably formed from a metal or high strength plastic that can withstand high temperatures of up to approximately 600° F. These spacers or spines 64 allow one or more heated pots or pans that have been on a stove or the like to be temporarily placed on the platform 46. Additionally, if not being used for a pot or pan, or space is available, heated pot or pan covers, lids or tops may be placed on the platform 46 for temporary storage, for example when removed to add ingredients to or stir contents in the pots or pans on a stove or other cooking surface.

The board or platform 46 includes a handle 66, and is preferably formed in two or more sections, such as 68, 70, 72, with means to allow the board to be selectively elongated or extended, when more room is needed, such as when it is desired to accommodate larger lids, pots, pans, or the like. For example, as best shown in FIG. 4, the platform 46 may include a plurality of openings 74, 76 formed through portions of the sections 68, 70, 72. Rods or shafts 78, 80 are secured in the openings 74, 76 by securing means 82, 84, 86, 88 at opposed ends thereof. The securing means 82, 84, 86, 88 are captured or held in chambers or openings 74, 76, 90, 92 formed in the section 68 to enable the sections to be elongated or extended (see the broken line representation in FIG. 2), by pulling or pushing the handle 66.

Figure 3:
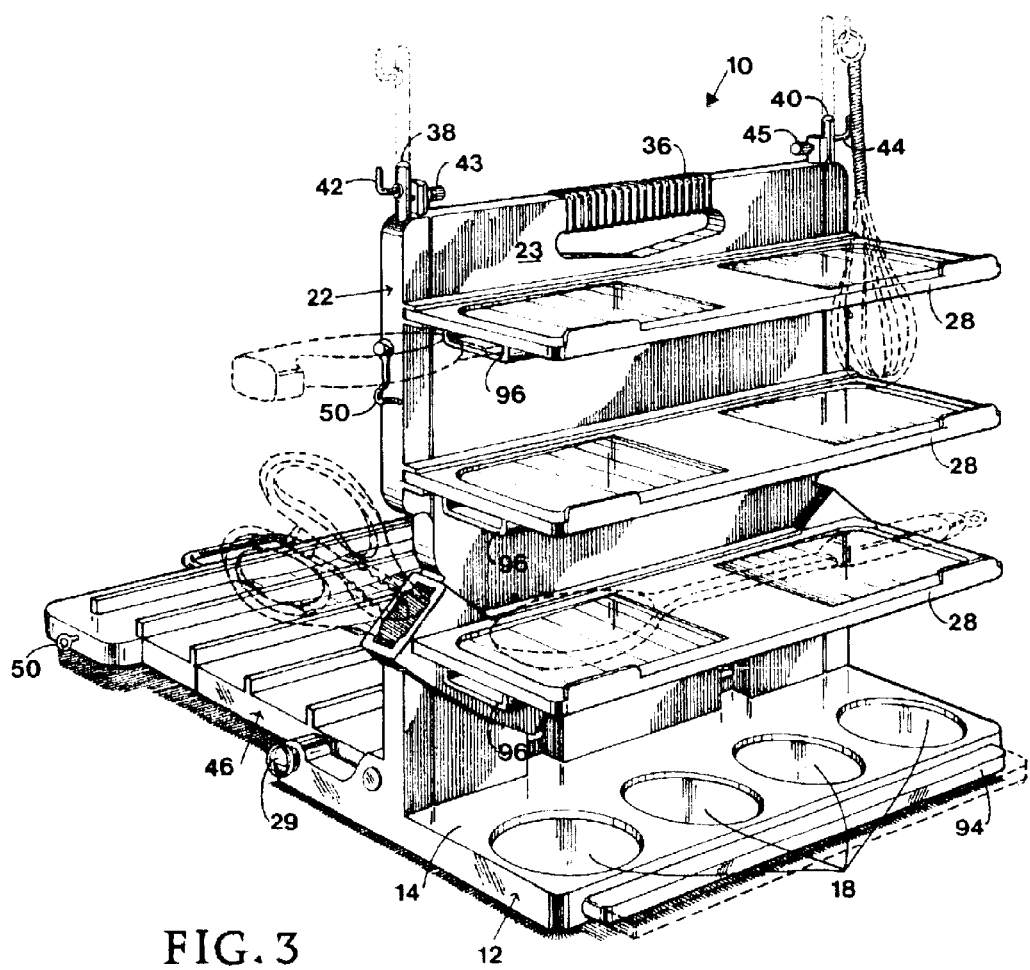
FIG. 3 is a still further perspective view of the kitchen-cooking caddy of the present invention looking toward shelves on a second side.

As best shown in FIGS. 3 and 5, the base 12 may be provided with a cutting board 94 held in an opening 96 formed in the base, below the recessed areas 18. The cutting board 94 may be selectively pulled out or retracted for use, cleaning or storage. Additionally, other trays may be slidably held in the base 12, preferably on the ends thereof, to catch drippings or other debris from utensils held on the hooks 42, 44.

It, therefore, can be seen that the present invention provides a portable caddy for use in and around a stove in a kitchen or other cooking area. The portable caddy includes a number of features to aid cooks in preparing and cooking meals, while maintaining the space being used in a clean and orderly condition. The caddy has a support base with a wall having angled holders and a movable platform that may be locked in an open or closed position on a first side. In the open position the platform is preferably locked in place and used to conveniently support a pot, a pan, a lid, or the like. The platform, when locked in the open position includes means to allow the entire caddy to be rotated, and is easily extensible to accommodate different size items. A number of adjustable or removable shelves are held on a second side of the wall for convenient storage of spoons or the like while preparing foods or cooking. Condiments and a retractable cutting board may be conveniently held in the base. Additionally, extensible rods may be secured in a top portion of the wall, for holding further items.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A portable caddy for supporting a variety of items while cooking or preparing foods, comprising:
   a base having a bottom surface and a top surface;
   the top surface having a plurality of separate depressions for holding containers;
   a wall secured to the base along a side edge thereof, and extending above the top surface;
   a movable platform secured to a first side of the wall; and
   a plurality of shelves on a second side of the wall.

2. The portable caddy of claim 1, further including angled holders in the wall for supporting utensils.

3. The portable caddy of claim 2, further including a carrying handle for the caddy and extensible holding rods adjustably held in a top of the wall.

4. The portable caddy of claim 3, further including locking means for selectively holding the movable platform in an open and a closed position.

5. The portable caddy of claim 4, further including means on the movable platform to allow rotation of the caddy when the movable platform is locked in the open position.

6. The portable caddy of claim 5, further including means in the movable platform to allow extension thereof.

7. The portable caddy of claim 6, further including a retractable cutting board held in the base.

8. The portable caddy of claim 7 wherein the plurality of shelves are removable and the base includes a pair of legs secured thereto to aid in supporting the caddy.

9. The portable caddy of claim 1, further including locking means for selectively holding the movable platform in an open and a closed position and means secured to a lower surface of the movable platform to allow rotation of the caddy when the movable platform is locked in the open position.

10. The portable caddy of claim 9, further including angled holders in the wall for supporting utensils, a carrying handle for the caddy formed in a top of the wall and extensible holding rods adjustably held in the top of the wall.

11. The portable caddy of claim 10, further including means in the movable platform to allow extension thereof, a retractable cutting board held in the base and wherein the base includes a pair of legs secured thereto to aid in supporting the caddy.

12. The portable caddy of claim 11 wherein the locking means are comprised of hooks and retractable elements and the plurality of shelves are removably held in the wall.

13. The portable caddy of claim 12 wherein the means in the movable platform to allow extension are comprised of plurality of shafts held in openings formed in separate sections of the movable platform.

14. The portable caddy for supporting a variety of items while cooking or preparing foods, comprising:
   a base having a bottom surface, a top surface and a plurality of side edges;
   the top surface having a plurality of separate depressions for holding containers;
   a wall secured to the base along one of the plurality of side edges and extending above the top surface;
   a carrying handle held in a top portion of the wall;
   angled implement holders held in the wall between the top surface and the top portion of the wall;
   a platform rotatably secured to a first side of the wall; and
   a plurality of shelves removably held in a second side of the wall.

15. The portable caddy of claim 14, further including locking means for selectively holding the platform in an open and a closed position and extensible holding rods adjustably held in a top of the wall.

16. The portable caddy of claim 15 wherein the platform includes a plurality of shafts and a handle to allow extension thereof.

17. The portable caddy of claim 16, further including a retractable cutting board held in the base.

18. The portable caddy of claim 14 wherein the base includes a pair of legs secured to the base along the one of the plurality of side edges to aid in supporting the caddy.

19. The portable caddy of claim 14, further including means secured to a lower surface of the movable platform to allow rotation of the caddy when the movable platform is locked in an open position.

20. The portable caddy for supporting a variety of items while cooking or preparing foods, comprising:
   a base having a bottom surface, a top surface and a plurality of side edges;
   the top surface having a plurality of separate depressions for holding containers;
   a wall secured to the base along one of the plurality of side edges and extending above the top surface;
   a carrying handle held in a top portion of the wall;
   a pair of extensible holding rods adjustably held in opposed sides of the top portion of the wall;
   locking means for selectively holding the platform in an open position and a closed position;
   angled implement holders held in the wall between the top surface and the top portion of the wall;
   a platform rotatably secured to a first side of the wall and having a rotatable element secured to a bottom surface thereof to allow the caddy to be rotated when the platform is locked in the open position; and
   a plurality of shelves removably held in a second side of the wall.

* * * * *